Dec. 16, 1947.    N. N. SAUDER    2,432,589
TRACTOR IMPLEMENT
Filed May 21, 1946    3 Sheets-Sheet 2
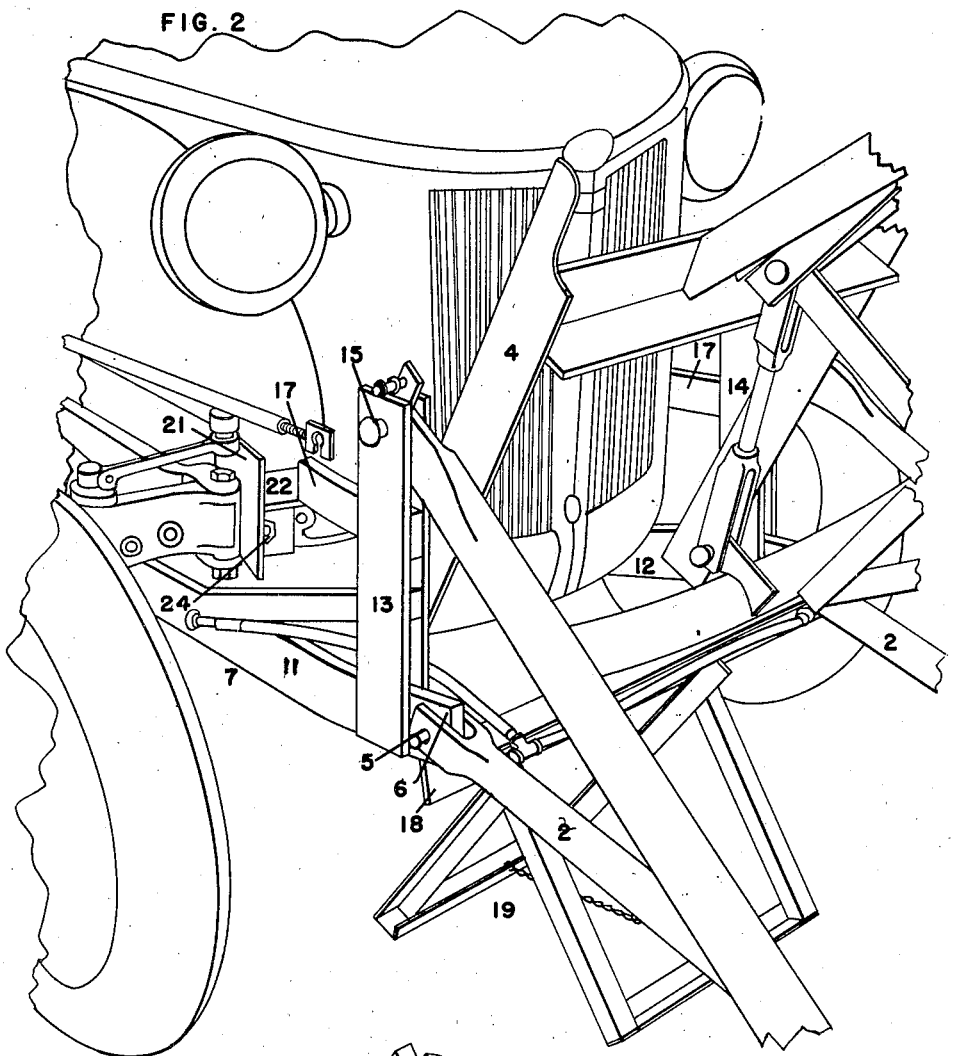
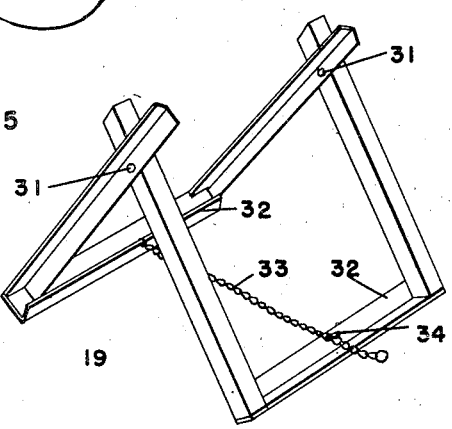
INVENTOR.
NOAH N. SAUDER
BY Murray W. Gould
ATTY.

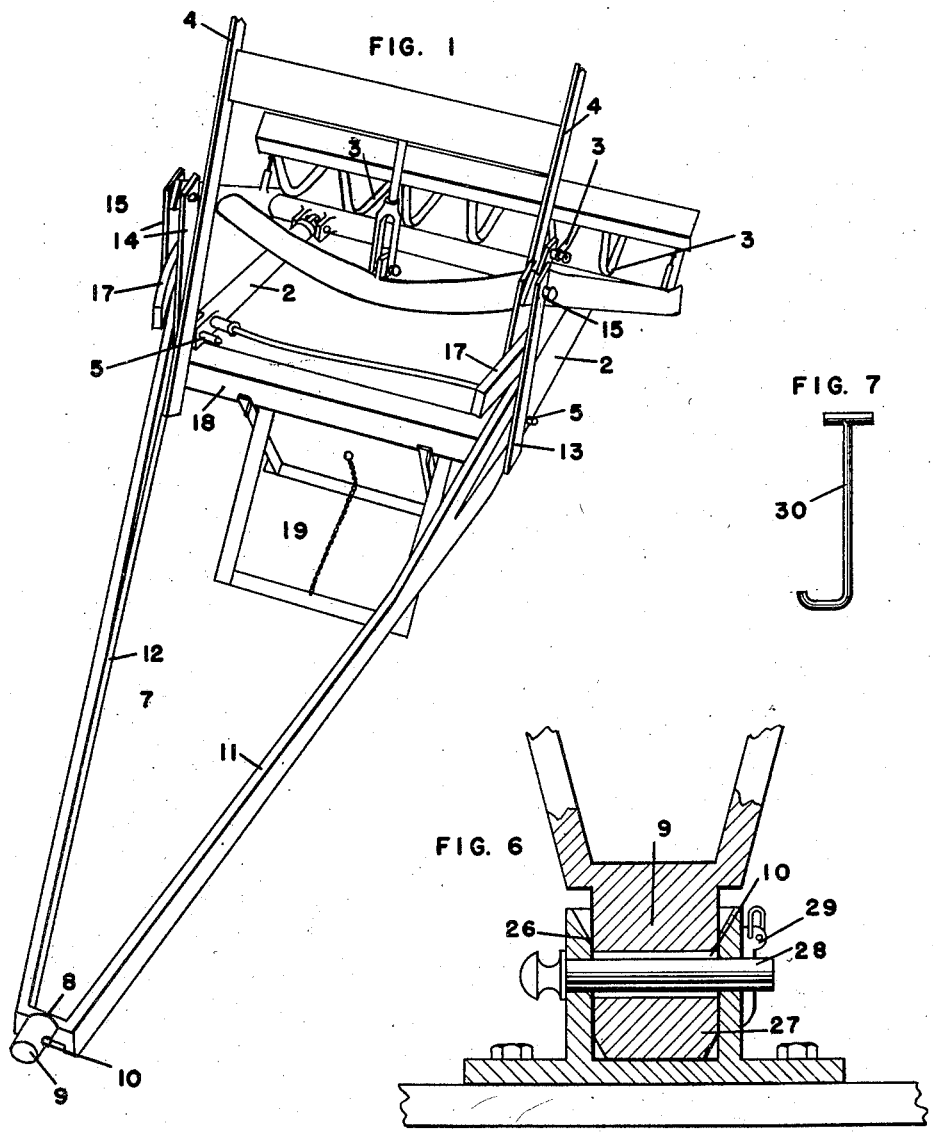

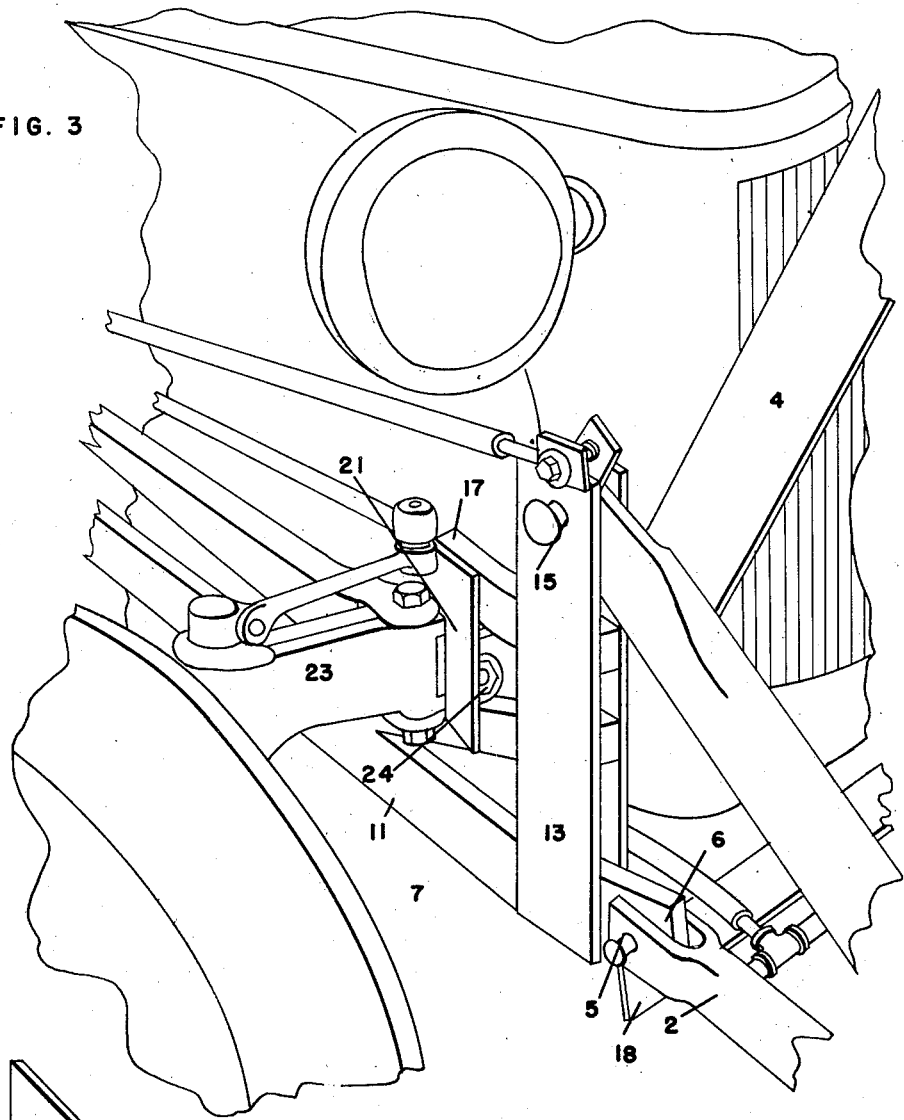
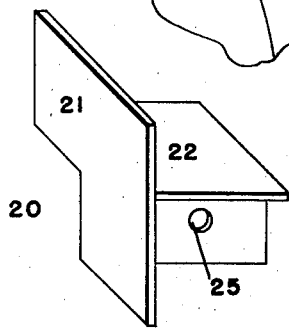

Patented Dec. 16, 1947

2,432,589

UNITED STATES PATENT OFFICE 2,432,589

TRACTOR IMPLEMENT

Noah N. Sauder, New Holland, Pa.

Application May 21, 1946, Serial No. 671,357

4 Claims. (Cl. 214—131)

This invention relates to a quick detachable connection for implements carried by tractors and the like.

The object of the present invention is to provide an apparatus which may be permanently attached to an implement to be used with the tractor and which rigidly connects said implement to said tractor with a minimum of labor.

A further object of the present invention is to provide a tractor connection for implements, said connection to be permanently affixed to the implement and capable of quick detachable connection with the tractor with a minimum expenditure of time and labor.

A further object of the present invention is to provide an attachment for tractor carried implements which serves as a link between the implement and the tractor and which may be detached from the tractor by the removal of a single connection.

A still further object of the present invention is to provide a connection between a tractor carried implement and the tractor, said connection to be permanently attached to the implement by means of which one man may quickly and efficiently connect an implement too heavy for a man to handle to the tractor with a minimum expenditure of time and labor.

A still further object of the present invention is to provide means adapted to be attached to a tractor carried implement and to connect said tractor carried implement to said tractor with means for supporting said tractor carried implement and said connection means in a position for receiving said tractor.

A still further object of the present invention is to provide tools which may be utilized by the driver of a tractor for guiding a tractor carried implement into connection with the tractor.

A still further object of the present invention is to provide a tractor carried implement rigidly secured to said tractor through a single connection.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawings in which:

Figure 1 is a view of the working implement together with the attached connecting means.

Figure 2 is a view of the implement together with the connecting means in the position in which it is just being received by the tractor.

Figure 3 shows the connecting means in position on the tractor.

Figure 4 is a detail view of the angle iron attached to and forming part of the tractor frame.

Figure 5 is a view of the pivoted collapsible trestle.

Figure 6 is a detail view of the single connection of the connecting means with the tractor.

Figure 7 is a view of the hand hook.

Referring particularly to Figure 1, a loader 1 of the type shown and described in Patent #2,398,119 having hydraulic cylinders 2, forks 3, super-structure 4 is pivotally mounted at 5 on the ends 6 of a V-shaped connecting member 7.

The member 7 is formed from a vertex 8 having a cylindrical extension 9 provided with a lateral hole 10 with legs 11 and 12 which when in working position extend below the body of a normal tractor. Secured to the divergent ends 6 of the legs 11 and 12 are pairs of upright members 13 and 14. These members extend at right angles to the diverging legs 11 and 12 and are formed at their upper ends with pin receiving holes 15 for pivoting the supporting arms of the loader. Between the upper ends of these upright pairs 13 and 14 is secured rearwardly projecting tongues 17, the lower edges of which lie in a plane parallel to that formed by the legs 11 and 12 of the V-shaped connecting means. An angle iron 18 connects the diverging ends of the legs 11 and 12 and serves as means for supporting the entire mechanism on a pivoted collapsible trestle 19 which will be explained in detail hereinafter.

Secured to and forming part of the frame of the tractor (Figure 4) is an angle iron 20 having side members 21 and a seat portion 22. This angle iron 20 is placed in position on the axle 23 and is pulled in position by a bolt 24 passing through the hole 25 of the downward projection of the angle iron. The iron 20 in position on the axle receives the tongue 17 on the seat 22, the seat 22 being sufficiently wide so that the tongue will easily seat itself.

The cylindrical end 9 of the V-shaped member 7 is received in a socket 26 attached to the underside of the tractor and approximately under the driver's seat. The end 27 of the cylindrical projection may be bevelled to provide easy entrance into the socket which is also bevelled. A pin 28 passing through holes in the socket and through the hole 10 of the cylindrical projection is secured in place by a locking pin 29 and itself securely holds the V-shaped connecting means firmly in a working implement's supporting position, both of the tongues 17 resting on the seats 22 of the irons 20 and the cylindrical projection 9 held in the socket 26. This pin 28 forms the only connection, with the exception of the hose connection to the hydraulic cylinders attaching the working implement to the tractor.

To assist in connecting the working implement and its attached connecting means with the tractor it is necessary that two aids be used, the first a pivoted collapsible trestle 19 (Figure 5) and a pair of hand hooks 30 (Figure 7). The trestle is formed of angle irons pivoted at 31 and having supporting cross-members 32 and a locking chain 33. The trestle 19 is placed under the angle iron 18 shown in Figures 1 and 2 at a height from the floor sufficient to bring the tongues 17 approximately level with the seats 22. The working implement may be stored in this position which renders it easy for the farmer to either attach or remove the loader.

In attaching the loader to the tractor, we will assume that the trestle is in position below the angle iron 18 and the tongues 17 on a level so that the lower edge of the tongue is slightly below the seat 22. The tractor is then driven over the V-shaped member so that the cylindrical end 9 is centrally positioned of the tractor until the edge of the tongue contacts the edge of the iron 20. A slight forward motion of the tractor rocks the entire loader on the trestle 19 which raises the loader and the tongue 17 so that the tongue 17 slides into the seat 22. The operator of the vehicle now, with a hook 30 in each hand leans forward grasping the legs 11 and 12 of the V-shaped member and guides the cylindrical end 9 into the socket 26. This is a very simple operation and is accomplished in less than half a minute. The slipping in of the pin 28 and locking by means of the locking key 29 also is a very simple operation making it only necessary to make another single hose connection for the hydraulic system and the device is attached to the tractor ready to operate as the chain 33 on the trestle is removed from the pin 34 and the trestle collapsed and taken away.

In removing the working implement the trestle 19 in its collapsed position is placed under and raised up against the angle iron 18 and the chain connected to the pin 34. The locking key 29 is removed and the pin 28 pulled out, the tractor slowly backed from the implement, the slow backing movement causing the trestle to rock slightly and lift the weight of the entire working implement so that the tractor easily slides from beneath the tongues 17.

It will thus be seen that a connecting link is shown which makes it easy and quick for a farmer to connect or disconnect any of a number of working implements which could be attached in this manner.

What is claimed is:

1. A connection between a tractor carried implement and said tractor comprising a substantially V-shaped member extending beneath said tractor and for a distance approximately equal to half the length of said tractor, means connected to and supported by the front ends of said V-shaped member for slidable connection with said tractor, a bar connecting the open ends of said V-shaped member and means adapted to be positioned beneath said bar to elevate said connecting member upon movement of the tractor to a position where said slidable means will be receivable on said tractor.

2. A connection between a tractor carried implement and a tractor comprising a substantially V-shaped member extending beneath said tractor, means associated with said tractor and slidably receiving the apex end of said V-shaped member, means for securely locking said end in position, a pair of uprights secured to the free ends of said V-shaped member and adapted to support said tractor carried implement, tongues extending from said uprights, parallel to and in the same direction of said V-shaped body and slidably receivable on said tractor.

3. A connection between a tractor, having a pair of horizontal slides arranged one on each side of said tractor, and a tractor carried implement comprising a substantially V-shaped frame member extending beneath said tractor with the apex end toward the rear of the tractor, the free ends of the tractor each supporting a horizontal bar adapted to engage the horizontal slides of said tractor and means for supporting said connection and said attached implement a distance above the ground so that the bottom edges of the horizontal bars are slightly below the tractor slides whereby movement of the tractor against the connection rocks said supporting means and elevates said bars to a position to be received on said slides.

4. A connection between a tractor, having a pair of horizontal slides arranged one on each side, and a tractor carried implement adapted to be attached to said connection, comprising a substantially V-shaped frame, the apex end of which extends beneath and towards the rear of the tractor, means carried by the diverging ends of the V-shaped frame being slidably received by said horizontal slides when at proper height, means supporting said tractor detached connection and implement at a proper height, and a single means locking said apex end of the frame, securing said connection and attached implement in position.

NOAH N. SAUDER.

REFERENCES CITED

The following references are of record in the file of this patent:

UNITED STATES PATENTS

| Number | Name | Date |
| --- | --- | --- |
| 1,713,030 | Cummings | May 14, 1929 |
| 1,852,200 | Camp | Apr. 5, 1932 |
| 2,264,050 | Newell | Nov. 25, 1941 |
| 2,398,119 | Sauder | Apr. 9, 1946 |
| 2,415,015 | Lull | Jan. 28, 1947 |